US010031258B2

(12) United States Patent
Akselrod et al.

(10) Patent No.: US 10,031,258 B2
(45) Date of Patent: Jul. 24, 2018

(54) AIR CONDITIONER

(71) Applicant: INTERNATIONAL BUSINESS MACHINES CORPORATION, Armonk, NY (US)

(72) Inventors: Ben Z. Akselrod, Givat Shmuel (IL); Anthony Di Loreto, Ontario (CA); Steve McDuff, Ontario (CA); Kyle D. Robeson, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 15/221,952

(22) Filed: Jul. 28, 2016

(65) Prior Publication Data

US 2018/0031727 A1 Feb. 1, 2018

(51) Int. Cl.
*F24F 11/34* (2018.01)
*G01V 8/12* (2006.01)
(Continued)

(52) U.S. Cl.
CPC .............. *G01V 8/12* (2013.01); *G01V 11/002* (2013.01); *F24F 11/32* (2018.01); *F24F 2011/0052* (2013.01); *F25B 2500/04* (2013.01)

(58) Field of Classification Search
CPC ..... G01V 8/12; G01V 11/002; F25B 2500/04; F24F 2011/0052; F24F 11/0034; F24F 11/0012
(Continued)

(56) References Cited

U.S. PATENT DOCUMENTS 6,053,004 A * 4/2000 Beppu ................. F24F 1/36
62/262
2015/0136378 A1* 5/2015 Maeda ................ F24F 11/0034
1/34

FOREIGN PATENT DOCUMENTS

CN 103090472 5/2013
CN 202938426 5/2013
(Continued)

OTHER PUBLICATIONS

Leahey, Andrew; Does Turning on the Air Conditioner With the Cover on Break It?; Retrieved from the Internet; URL: http://www.ehow.com/info_12002410_turning-air-conditioner-cover-brea . . . ; Retrieved on Apr. 10, 2016; 3 pages.

*Primary Examiner* — Seung C Sohn
(74) *Attorney, Agent, or Firm* — Schmeiser, Olsen & Watts; Isaac J. Gooshaw

(57) ABSTRACT

Tools, methods and systems for detecting and reporting the presence of an obstruction to an AC system of the present disclosure are able to detect the presence of the obstruction using one or more sensors connected to the air conditioning unit and displaying an alert on the computer system of the AC system when the sensors detect the presence of the obstruction. By displaying an alert at the computer system's output device, the presence of the obstruction is brought to the user's attention, allowing the user to take remedial action as needed before initiating the air conditioning system into operation, preventing the obstruction from harming the components of AC system if the system was initiated while the obstruction was still present. Additionally, the AC system may further disable or prevent the operation and initiation of itself when the sensors of the air conditioning system detect the presence of an obstruction.

20 Claims, 10 Drawing Sheets

(51) Int. Cl.
    *G01V 11/00*     (2006.01)
    *F24F 11/00*     (2018.01)
    *F24F 11/32*     (2018.01)

(58) Field of Classification Search
    USPC ...................................................... 250/222.1
    See application file for complete search history.

(56) References Cited

FOREIGN PATENT DOCUMENTS

| | | |
|---|---|---|
| CN | 203010799 | 6/2013 |
| CN | 104359164 | 2/2015 |
| KR | 20130101362 | 9/2013 |

\* cited by examiner

AIR CONDITIONER

TECHNICAL FIELD

The present disclosure relates generally to air conditioner systems and methods for detecting and reporting the presence of an obstruction to the air conditioner system.

BACKGROUND

During the winter months, people generally engage in the practice of covering their air conditioning (AC) devices. This practice is often performed in areas of the country that may be prone to receiving heavy snow or other inclement weather patterns. The practice of covering an AC device from being exposed to so harsh exterior climates may protect the AC device from building up snow, ice, dirt, dust and debris, including debris from trees and leaves. The buildup of climate undesirable environmental obstructions may harm moving parts or become lodged in exhaust ports of the AC device. This in turn may lead to malfunctioning of the motors and other parts, necessitating replacement. However, obstructions that may harm moving parts or the presence of the cover may not be visible from the point where a user initiates the AC device. A user, unaware that an obstruction may unknowingly attempt to initialize the AC device thus causing damage to the AC device or cause the AC device to operate improperly.

SUMMARY

A first embodiment of the present disclosure provides a method for detecting and reporting a presence of an obstruction to an air conditioning device comprising the steps of receiving, by a sensor device connected to the air conditioning system and a central processing unit (CPU), a request to initialize a sensor of the sensor device; establishing, by the sensor device, in response to the request to initialize, a baseline detection signal further establishing a detection zone; identifying, by the sensor device, an alteration to the baseline detection signal within the detection zone; transmitting, by the sensor device, a reporting signal to the CPU, wherein the reporting signal switches a reporting state of an output device from unobstructed to obstructed.

A second embodiment of the present disclosure provides a computer system, comprising a CPU; a memory device coupled to the CPU; an air conditioning device having a sensor device coupled to the CPU of the computer system and a computer readable storage device coupled to the CPU, wherein the storage device contains program code executable by the CPU via the memory device to implement a method for reporting a presence of an obstruction to the air conditioning device comprising the steps of receiving, by a sensor device connected to the air conditioning system and a central processing unit (CPU), a request to initialize a sensor of the sensor device; establishing, by the sensor device, in response to the request to initialize, a baseline detection signal further establishing a detection zone; identifying, by the sensor device, an alteration to the baseline detection signal within the detection zone; transmitting, by the sensor device, a reporting signal to the CPU, wherein the reporting signal switches a reporting state of an output device from unobstructed to obstructed.

A third embodiment of the present disclosure provides a computer program product comprising a computer-readable storage device; and a computer-readable program code stored in the computer-readable storage device, the computer-readable program code containing instructions that are executed by a central processing unit (CPU) of an air conditioning system implementing a method for reporting a presence of an obstruction to an air conditioning device, the method comprising the steps of: receiving, by the air conditioning system, a request to initialize a sensor of a sensor device; establishing, by a sensor of the air conditioning system, in response to the request to initialize, a baseline detection signal further establishing a detection zone; identifying, by the air conditioning system, an alteration to the baseline detection signal within the detection zone; switching, by the air conditioning system, a reporting state of an output device from unobstructed to obstructed as a function of the identifying step.

DETAILED DESCRIPTION

Overview

Figure 1A:
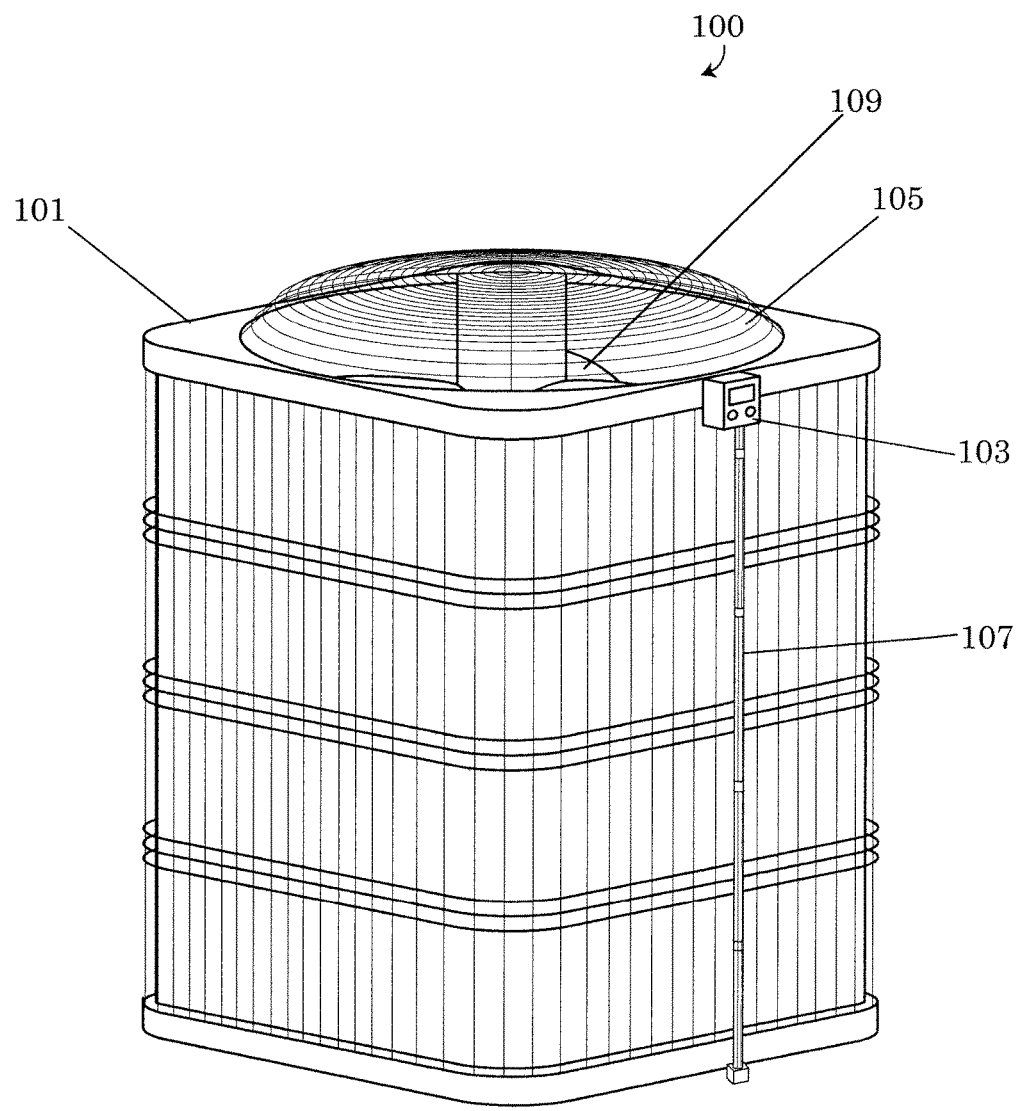
FIG. 1a depicts an isometric view of an embodiment of an air conditioning device.

Embodiments of the present disclosure recognize that the presence of an obstruction to an air conditioning system, mainly an obstruction to the air conditioning device itself may hinder the operation of the air conditioning system. A computer system controlling the operation of the air conditioning device may not be within a visual line of sight to the air conditioning device. A user that is unable to visually inspect the air conditioning system prior to initiation of the air conditioning device, may be unaware of or may have forgotten about the presence of an obstruction, such as fallen debris or a protective covering. Currently available air conditioning systems do not have the capabilities for detecting the presence of an obstruction to air conditioning systems, nor do currently available systems provide a means for reporting or displaying the presence of an obstruction to the computer system controlling air conditioning system.

Embodiments of the present disclosure provide tools, methods and systems for detecting and reporting the presence of an obstruction to an air conditioning system directly at the point of user interaction at a controlling computer system integrated into or connected to the air conditioning system. Embodiments of the present disclosure are able to detect the presence of the obstruction using one or more sensors connected to the air conditioning unit and displaying an alert on the computer system's output device when the sensors detect the presence of the obstruction. By displaying an alert at the computer system's output device, the presence of the obstruction is brought to the user's attention, allowing the user to take remedial action as needed, before initiating the air conditioning system into operation. Furthermore, the current application recognizes that in some instances, the presence of an obstruction may harm an air conditioning system if the system was initiated while the obstruction was still present. Embodiments of the present disclosure may further disable or prevent the operation and initiation of the air conditioning system when the sensors of the air conditioning system detect the presence of an obstruction.

Air Conditioning System

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIG. 1a depicts an embodiment of an air conditioning (AC) device 100 of an AC system 300. An AC device may refer to any apparatus capable of controlling the level of humidity, ventilation and/or temperature within a building or vehicle. Embodiments of the AC device 100 may be a freestanding or centralized AC device 100, as exemplified in FIGS. 1a-3. In alternative embodiments, the AC device 100 may be for example, a split system AC, heat pump, evaporative cooling devices, portable AC device, ductless mini-split system, window installable or ceiling installable AC devices or any other AC device known by those skilled in the art.

The AC device 100 may include a housing 101. The housing 101 may be any rigid protective casing which may have an exposed exterior surface capable of protecting one or more moving pieces or delicate components stored therein. For example, the housing 101 of the AC device 100 may provide a rigid and protective casing to shield sensitive and/or moving components within the interior of the AC device 100 including the exhaust fan 109, condenser 120 and the cooling coils 122. The housing 101 may protect the interior components from being damaged by external forces positioned outside of the housing 101, including inclement weather such as rain, snow, wind and excessive heat as well as dust and debris generated by the surrounding environment. The housing 101 may prevent or reduce accessibility and exposure of the components housed within the interior to contact by animals and humans. Embodiments of the housing 101 may be constructed out of metals, metal alloys, galvanized sheet metal, structural steel, aluminum or one or more plastics or plastic resins.

Figure 2:
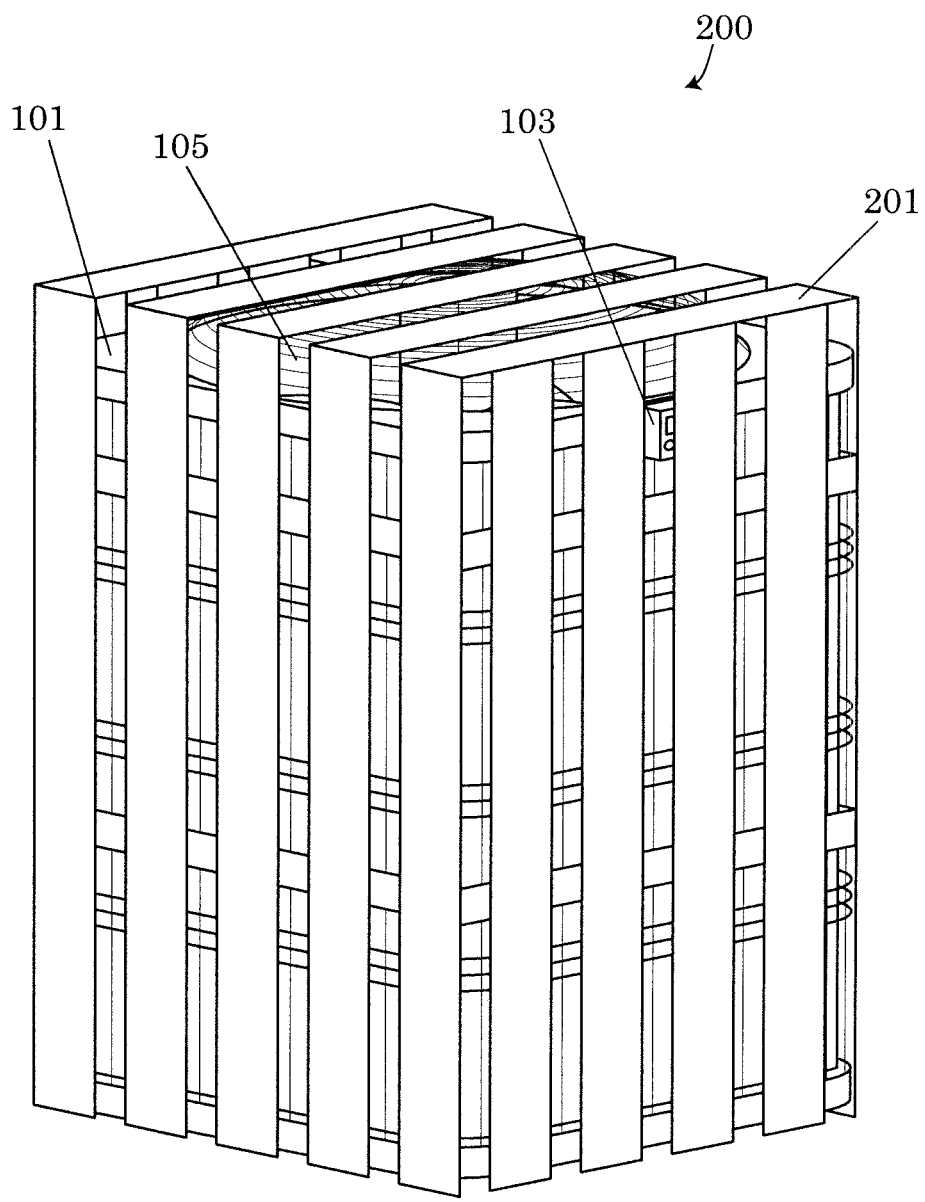

Embodiments of the AC device 100 may further comprise or be connected to a sensor device 103 capable of detecting the presence of an obstruction. Embodiments of the AC device 100 may include a single sensor device 103 which may be equipped with one or more sensors positioned within the sensor device 103, or the sensors may be connected to the sensor device and placed in one or more varying positions along the exterior surface of the housing 101. In some embodiments, the sensors may be placed within the interior of the housing 101, for example within the exhaust vent 105 as shown in FIG. 2. In an alternative embodiment of the AC device 100, a plurality of sensor devices 103 may be attached or connected to the AC device 100 and distributed to one or more locations on the exterior surface or interior cavity of the housing 101. Embodiments of the sensor device 103 may be defined as any apparatus that responds to a physical stimulus, such as heat, light, sound, pressure, magnetism or a particular motion, and in response to the stimulus, the sensor device 103 transmits a resulting signal or impulse that is capable of being measured by a recipient device, such as a computer system 301.

Embodiments of the sensor device 103 may include one or more sensors that may respond to a physical stimulus that may result from an obstruction to the sensors. More particularly, in the exemplary embodiment, the physical stimulus being measured by the sensors may be the presence or absence of an AC device cover 201 of a covered AC device 200 as shown in FIG. 2. In an alternative embodiment, the sensor device 103 may also detect and measure the presence or absence of a physical obstruction within the interior of the housing 101. For example, the sensor device 103 may detect the presence or absence of a foreign object or environmental debris lodged within the cavity forming the exhaust vent 105.

The sensor device 103 may, in some embodiments include one or more sensors working together or separately to identify various obstructions. For example, the sensor device 103 may include one or more classes of sensors including an optical sensor, electro-optical sensor, optical switch, proximity sensor, motion sensor, acoustic sensor, mechanical sensor environmental sensor, magnetic sensor or any other type of sensor that may detect the presence or absence of a physical stimulus entering or leaving a detection zone or area of the sensor.

Embodiments of optical sensors, electro-optical sensors and optical switches integrated into the sensor device 103 may convert light rays into electric signals, thereby allowing for the measurement of a physical quantity of light than can be translated into a form that is readable by an instrument, such as the sensor device 103 or an attached computer system. Embodiments of the optical sensors, electro-optical sensors and optical switches may include a trigger that may react to a change or alteration to the signal being emitted by the optical or electro-optical sensor. When a measurable change occurs to the light ray being emitted, the optical or electro-optical sensor may operate as a photoelectric trigger and either increase or decrease an electrical output which may be sent to the separate instrument translating the signals received by the sensors. In the exemplary embodiment, the instrument measuring the output of the optical or electro-optical sensors may be a computer system 301, such as the thermostat computing device depicted in FIGS. 4a-4b.

In alternative embodiments, instead of using optical sensors and switches to measure and respond to changes in physical stimulus interacting with the AC device 100, the sensor device 103 may be equipped with a proximity sensor that may be capable of detecting the presence of nearby objects without making any physical contact (such as a cover 201 placed over the AC device 100). A proximity sensor may operate by emitting an electromagnetic field or a beam of electromagnetic radiation (such as infrared). The proximity sensor identifies changes in the field or a return signal. Different proximity sensors may be used depending on the type of obstruction intended to be identified. For example a capacitive or photoelectric proximity sensor may be suitable for plastic targets whereas an inductive proximity sensor may be more suitable for a metal obstruction target.

An acoustic sensor on the other hand integrated as part of the sensor device 103 may rely on the modulation of surface acoustic waves to sense physical phenomenon or stimuli. Embodiments of the acoustic sensor may transduce an electrical signal input into a mechanical wave and then may transduce the wave back into an electrical signal, whereby changes in amplitude, frequency and time-delay between the input and output electrical signals can be used to measure the presence or absence of a physical stimuli or phenomenon, such as the presence or absence of an obstruction, such as a cover or blockage.

In some embodiments of the sensor device 103, the sensor employed may include mechanical sensors. Mechanical sensor class may include numerous different types of sensors that may operate using various principles to sense mechanical quantities, either directly or indirectly. Mechanical sensors may measure differences in various properties of the sensor and the surroundings such as the stress, force, torque, acceleration, or position of the sensor or sensor components (such as springs, plates, wire resistance, liquid or gases and the pressures they exert) when a force, pressure or load displaces the sensor signals as a result of the obstruction.

Examples of mechanical sensors that may be employed to measure and detect the presence of an obstruction to the AC device 100 may include strain gauges (including metallic, wire, resistive, semiconductor and optical fiber strain gauges), tactile sensors, force sensitive resistors (FSR sensor), accelerometers (for example: capacitive accelerometers, strain gauge accelerometers, variable inductance accelerometers, magnetic accelerometers, heated gas accelerometers, optical fiber accelerometers, multi-axis accelerometers), pressure sensors (for example: mechanical pressure sensors, bellows, diaphragm pressure sensor, membrane and plate sensors, piezo resistive pressure sensors, differential pressure sensors, capacitive pressure sensors, magnetic pressure sensors, optoelectronic pressure sensors, Fabri-Perot optical resonator, vacuum sensors), gyroscopes (mechanical, Coriolis force, optical, resonant fiber optic and coil optical fiber gyroscopes).

In some embodiments, magnetic sensors may be employed or incorporated into the sensor device 103. Magnetic sensors may include a microelectromechanical (MEMS) device capable of detecting and measuring magnetic fields. Magnetic sensors may electronically detect and measure changes in voltage or resonant frequency in some embodiments. In alternative embodiments, the magnetic sensors may measure mechanical displacement using voltage sensing, frequency shift sensing or optical sensing. For example a Lorentz-force-based MEMS sensor may rely on mechanical motion of the MEMS structure occurring due to the Lorentz force acting on the current-carrying conductor in the magnetic field. The mechanical motion of the microstructure may be sensed either electronically or optically. The mechanical structure may be driven to its resonance frequency in order to obtain the maximum output signal. In some embodiments, Piezo resistive and electrostatic transduction methods can be used in the electronic detection. Displacement measurements may also be made optically using a laser source or LED source.

In some embodiments of the sensor device 103, the sensor device 103 may include a range-finding sensor incorporated therein. Similar to the acoustic or sound sensors described above, the range finding sensor may detect the presence of obstacles in the path of the sensor by propagating sounds waves. These sound waves may bounce off of a reflective surface and return to the sensor. The sensor device 103, or the computer system 301 connected to the sensor device 103 may calculate the amount of time it takes for the wave to return to the range finder sensor. When an object is detected, such as the placement of a cover which may shorten the amount of time for the wave to return, the sensor device 103 may become aware that the cover 201 has been placed over the AC device 100.

In yet another alternative embodiment, the sensor device 103 and the AC device cover 201 may include pairing sets of magnetic locks. For example, when the locks of the AC device cover 201 are paired with the sensor device 103, the locks magnetically bond. Sensors in the sensor device 103 may detect the magnetic linkage and therefore detect the presence of the AC device cover. Likewise, when the magnetic linkage is broken between the AC device cover 201 and the sensor device 103, the sensor device 103 may detect the absence of the cover's obstruction. In some embodiments, the sensor device 103 may include an object sensing camera connected to the AC device 100, which may detect the presence of an obstruction either alone or in conjunction with one or more sensors described above.

Embodiments of the sensor device 103 may be connected to or placed into communication with a computer system 301. In the exemplary embodiment 300 the AC device 100 may be connected to the computer system 301 via a hardwired signal conduit 107. The signal conduit 107 may transmit one or more signals between the sensor device 103 and the computer system 301, including data signals from sensor-based measurements and electrical signals. The types of signals and data transmitted from the sensor device 103 and the computer system 301 may vary depending on the number and types of sensor being used by the sensor device 103. In some embodiments, signals may be continuously or intermittently transmitted. For example, some sensors may provide an initial "detection signal." A "detection signal" may refer to a baseline signal emitted from the sensor or sensor device 103 for the purposes of comparison when the signal is altered or changed in the presence of a stimulus. In some embodiments, the detection signal may transmitted to the computer system 301. However in other embodiments, the detection signal may not be transmitted until after there has been an alteration or interruption to the detection signal. Once the detection signal has been changed or altered, the detection signal may be referred to as a "reporting signal". A "reporting signal" may refer to a signal that either directly or indirectly detects the presence of an obstruction, such as the placement of a cover 201 onto the AC device 100 or the presence of a foreign object covering or lodged within the AC unit 100. The reporting signal may include the output from the sensor device 103 that is transmitted to the computer system 301 to inform the computer system 301 of the presence of the obstruction.

Figure 1B:
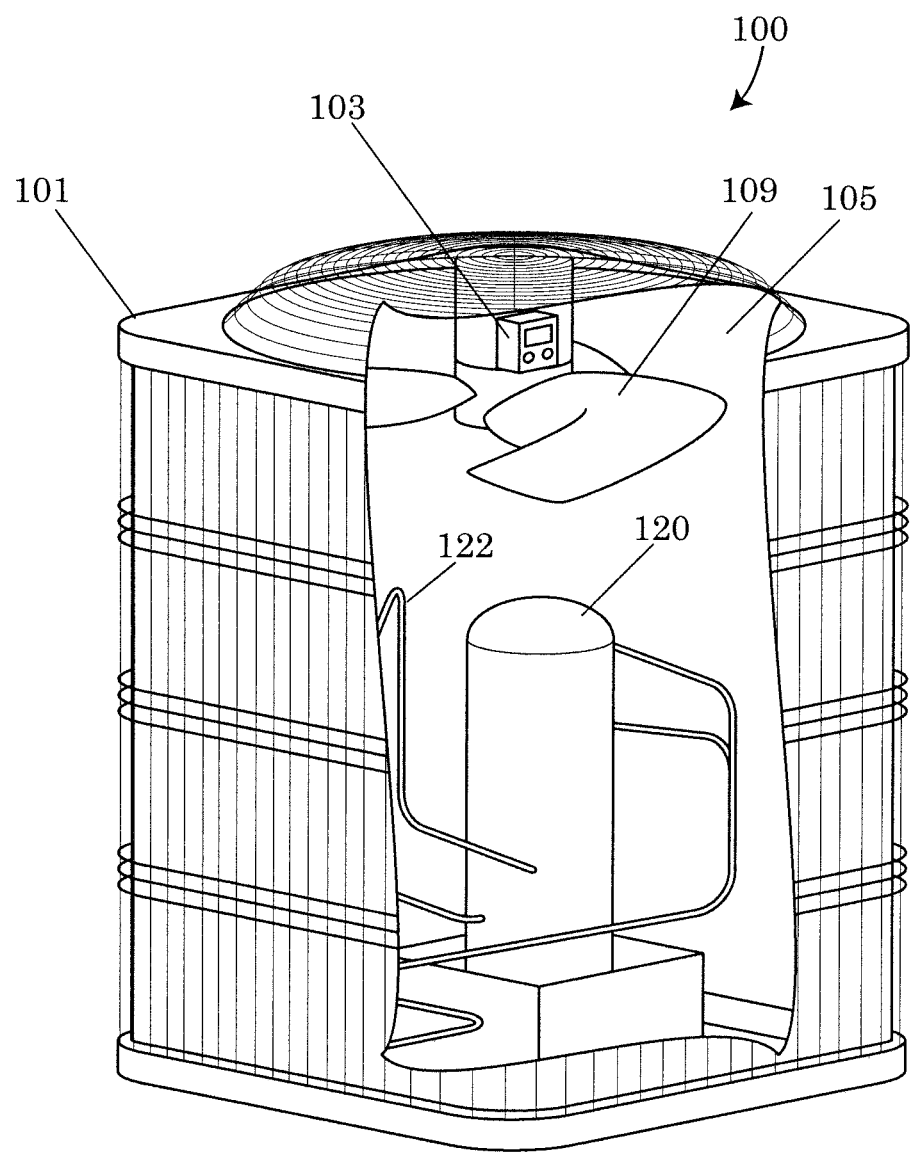
FIG. 1b depicts a partial cutaway view of the air conditioning device of FIG. 1a FIG. 2 depicts an isometric view of the embodiment of an air conditioning device equipped with a cover.
Figure 3:
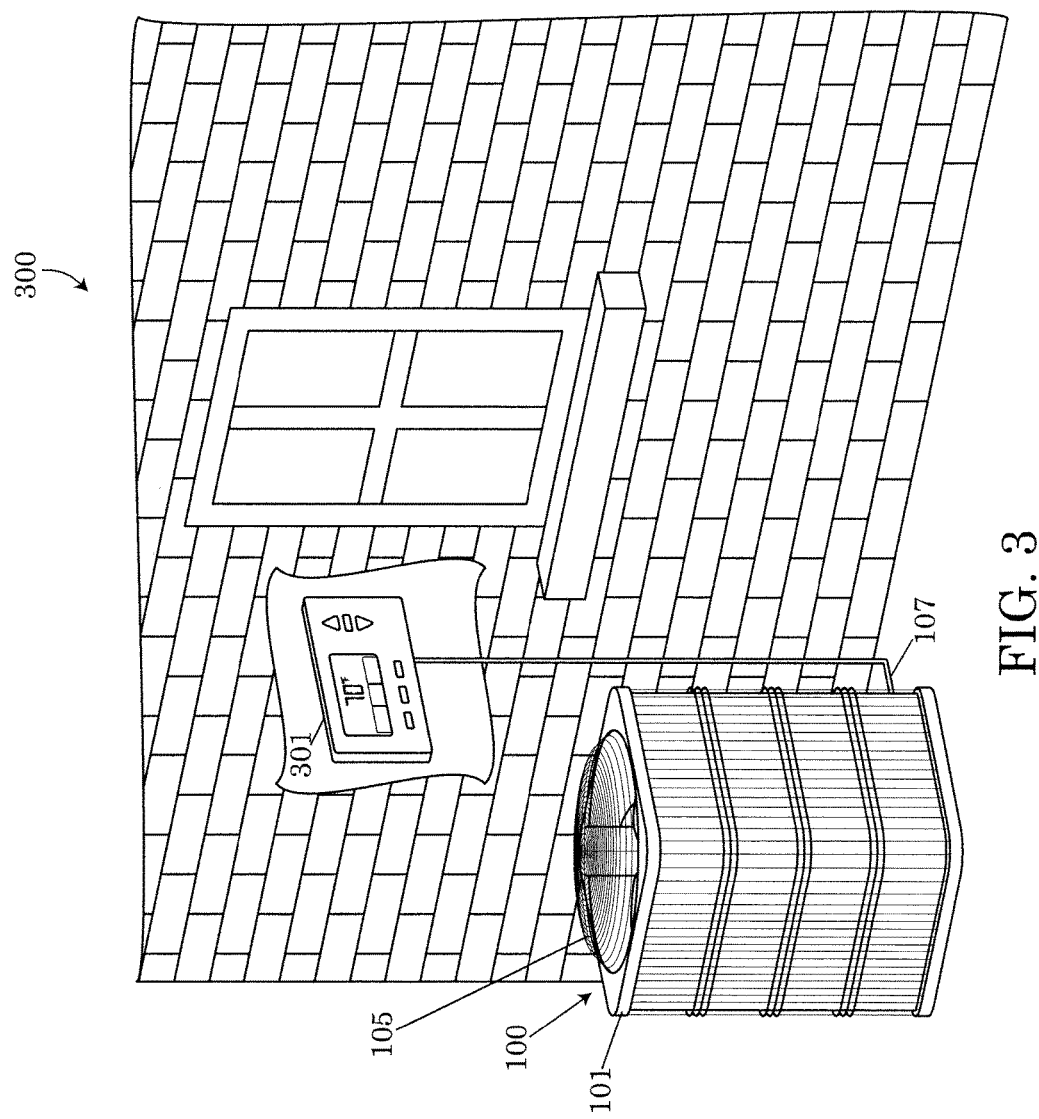
FIG. 3 depicts an embodiment of an air conditioning system.

In alternative embodiments, the signal conduit 107 transmitting output signals and data to the computer system 301 may be wireless, instead of a hardwired conduit pictured in FIG. 1 and FIG. 3. For example, the computer system 301 may include a wireless transmitter, receiver or transceiver such as a wireless network interface controller 309 capable of emitting and receiving a wireless data signal 311. In some embodiments, the signals and data being transmitted wirelessly by stabling a wireless network between the sensor device 103 and the computer system 301. For example, the wireless network may be established using Wi-Fi, Bluetooth, Bluetooth low energy (BLE), ZigBee, WiMax, light fidelity (Li-Fi), infrared or other wireless communication protocols known by those skilled in the art.

Figure 4A:
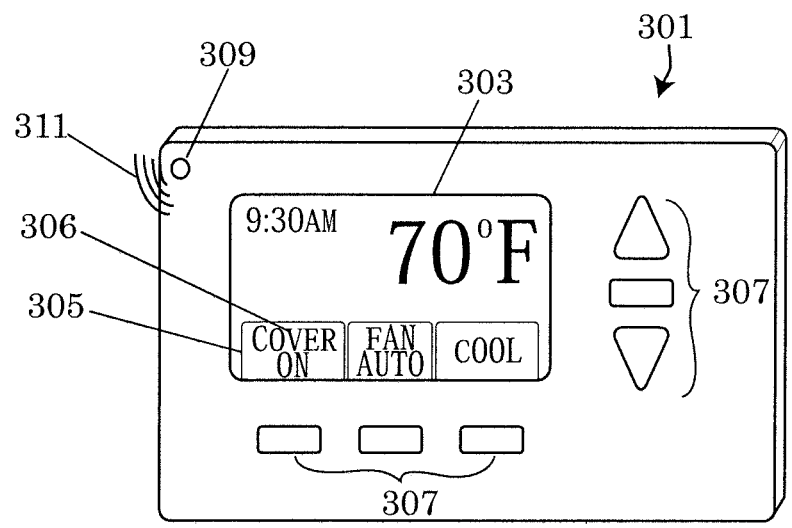
FIG. 4a depicts an embodiment of a computer system reporting an air conditioner device in a covered state.
Figure 4B:
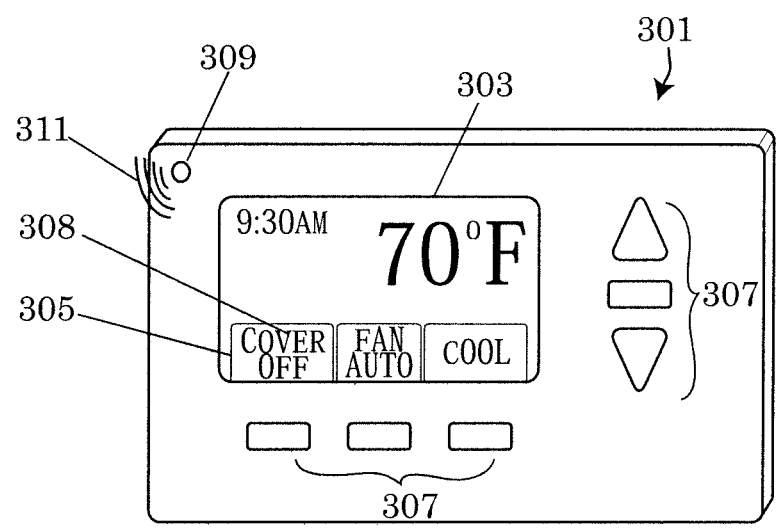
FIG. 4b depicts an embodiment of a computer system reporting an air conditioner device in an uncovered state.

Referring to the drawing, FIG. 4a and FIG. 4b illustrate an embodiment of the computer system 301, integrated into embodiments of the AC system 300, 500, 600. The computer system 301 may be any general purpose computing system as described below and in FIG. 9 of this application in some embodiments. In other embodiments, the computer system 301 may be a specialized computing system including specialized circuitry, modules, hardware and software. For example, as depicted in the drawings, the computer system 301 may be a computer system operating as a thermostat, which may not only detect and report the presence of an obstruction, but further allow a user to control the AC system 300, 500, 600 to regulate the temperature and climate of the surrounding area connected to the AC system.

Embodiments of the computer system 301 may include one or more input devices 307 such as buttons, knobs, touch screen inputs, etc. As shown in the exemplary embodiment of FIGS. 4a and 4b, the input devices of the computer system may include one or more buttons of a thermostat. The computer system 301 may further include an output device 303 such as a display device reporting parameters of the AC system 300, 500, 600. The output device may include such parameters as the time, current temperature, desired temperature setting, fan settings, and an obstruction indicator 305. As shown in FIG. 4a, the embodiment includes an obstruction indicator 305 that indicates a cover obstruction 306, whereas in FIG. 4b, the embodiment of the computer system 301 indicates the absence of a cover obstruction 308. In some embodiments, the computer system 301 may not specifically identify the absence of a cover; instead, the obstruction indicator 305 may be left blank as shown by the computer system 301 depicted in FIG. 3.

Embodiments of the computer system 301 may further comprise one or more additional modules. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device 515 of the computer system 301. A module (whether hardware, software, or a combination thereof) may be designed to implement or execute one or more particular functions or routines. Each AC system 300, 500, 600 described herein may include an air conditioning module 503.

Embodiments of the air conditioning module 503 may include one or more components of hardware and/or software program code for operating air conditioning system 300, 500, 600 settings including the temperature settings of a thermostat, sending and receiving sensor signals and reporting the presence of obstructions as a function of the sensor signals received. For example, in some embodiments, the computer system 301 may include a thermostat module 505, a sensor detection module 507 and/or a reporting module 509.

Embodiments of the thermostat module 505 may translate user input data via the input device 307 into one or more AC system outputs. For example, the thermostat module may send and receive data and commands from the user input to initiate the AC device 100, adjust temperature settings, modulate fan controls and fan speeds. The thermostat module 505 may also receive feedback from the AC device 100 regarding requests to initiate the AC device 100 and whether or not the AC device 100 has been initiated in response to user input or changes temperature settings. For instance, a user may decrease the temperature setting of the computer system 301 using one or more input devices 307. As the temperature decreases below the ambient temperature of the surrounding environment, the thermostat module may send an initiation signal to the AC device 100 to turn on in order to reduce the measured temperature to the desired temperature set by the user's input.

The sensor detection module 507 includes hardware, software or a combination of hardware and software loaded into the memory device 515 of the computer system 507 allowing for the computer system 301 to communicate between with the sensor device 103 and the series of signals propagated by the sensors of the sensor device 103, including an initial detection signal setting the baseline signal of a sensor and a reporting signal identifying alteration to the detection signal indicating the presence of an obstruction. The sensor detection module 507 may in some embodiments send and receive data signals and signals propagated in response to physical stimuli detected by the sensor device 103, including for example changes in electrical voltage, electrical resistance, frequency of waves, amplitude of waves, timing of a return wave, pressure increases, or any other measured physical response that may be measured by the sensor and transmitted to the computing system. Embodiments of the sensor detection module may also send requests to the sensor device 103 requesting the sensor device 103 initialize or activate the sensors of the sensor device 103. In some embodiments, the sensor detection module 507 may further include an analytics engine capable of correlating the sensor readings and measurements of the sensor device 103 and identifying the type of obstruction that has occurred.

Embodiments of the sensor detection module 507 may translate the detection and reporting signals received by the sensor device 103 and in response convert the signals into programmable instructions, commands or tasks to be fulfilled by the computer system, thermostat module 505 and reporting module 509. For example, the thermostat module 505 may issue an initiation command to the AC device 100 to start the AC device in order to reach a programmed temperature initiated by the user. However, upon the sensor detection module 507 receiving signal data or other sensor based information indicating the presence of an obstruction, the sensor detection module 507 may issue a programming instruction, task or other command to the thermostat module 505 to cease initiation and operation of the AC device 100 to prevent damage or harm to the components of the AC device 100 or the AC system 300, 500, 600.

Embodiments of the reporting module 509 may be responsible for receiving, reporting and displaying parameters of the AC system 300, 500, 600 on the output device 303 of the computer system 301. For example, the reporting module may display temperature information, fan settings, whether the AC device 500 is engaged and operating received from the thermostat module 505 and display them in a manner than can be read and understood by the user. Moreover, the reporting module may further receive instructions and information from the sensor detection module 507 regarding the presence (or absence) of an obstruction, the location of the obstruction, which sensors are identifying the obstruction and the reporting module 509 may even display on an output device 303 of the computer system instructions for removing the obstruction from the AC device 100.

Referring to the AC system 500 of FIG. 5, in some embodiments, there may be a plurality of sensor devices 103a, 103b . . . 103n (hereinafter referred to collectively as sensor devices 103) present in the AC system. Each of the sensor devices may be connected to an individual AC device 100, or a single AC device 100 may have a plurality of sensor devices 103 equipped thereon. The reference numbers with sub-letters and ellipses, for example describing sensor device 103a, 103b . . . 103n or signal conduit 107a, 107b . . . 107n (hereinafter referred to as "signal conduits 107") may signify that the embodiments are not limited only to the amount of elements actually shown in the drawings, but rather, the ellipses between the letters and the $n^{th}$ element indicate a variable number of similar elements of a similar type. For instance, with regard to sensor devices 103 any number of a plurality of sensor devices 103 may be present including sensor device 103a, sensor device 103b and a plurality of additional sensor devices up to the $n^{th}$ number of sensor devices 103n, wherein the variable "n" may represent the last element in a sequence of similar elements shown in the drawing.

Figure 5:
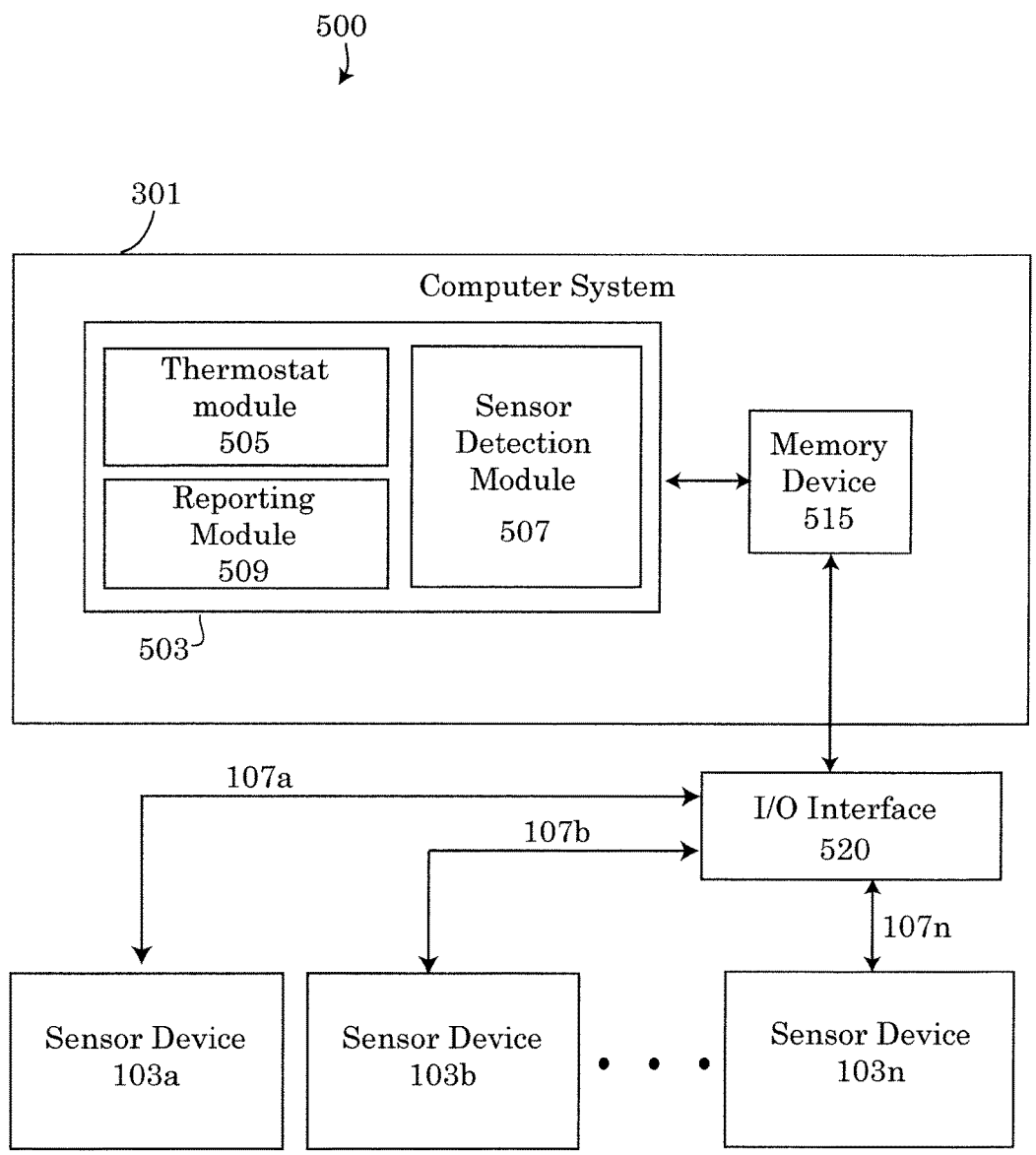
FIG. 5 illustrates a block diagram of an embodiment of an air conditioning system consistent with embodiments of the present disclosure.

As depicted in FIG. 5, each of the sensor devices 103 may transmit detection signals, reporting signals including data signals or measurable output signals from the sensor devices 103 via the signal conduits 107 transporting each of the signals transmitted and received between the computer system 301 and each of the sensor devices connected thereto. In some embodiments, an input/output (I/O) interface 520 may control and direct the signals being transmitted and received to and from the signal conduits 107. An I/O interface 520 may refer any communication process performed between the computer system 301 and the environment outside of the computer system 301, for example the sensor devices 103 and AC device 100. Input may refer to the signals or instructions sent to the computer 301 from a source outside of the computer system (for example: the sensor devices 103, sensors or AC device 100) while output may refer to the signals sent out from the computer system 301, for example to the sensor devices 103 and AC device 100 and output device 303. Signals outputted by the computer system 301 may include requests to initiate the AC device 100 when the desired temperature is less than the measured temperature, requests to terminate the AC device 100's function when the desired temperature is equal to or less than the measured temperature, or requests to terminate the AC device 100 upon detection of an obstruction by the sensor devices 103. The signals, data and other information transmitted and received by the computer system 301 may be stored by one or more memory devices and may be further transmitted to the AC module 503 for further processing.

Figure 6:
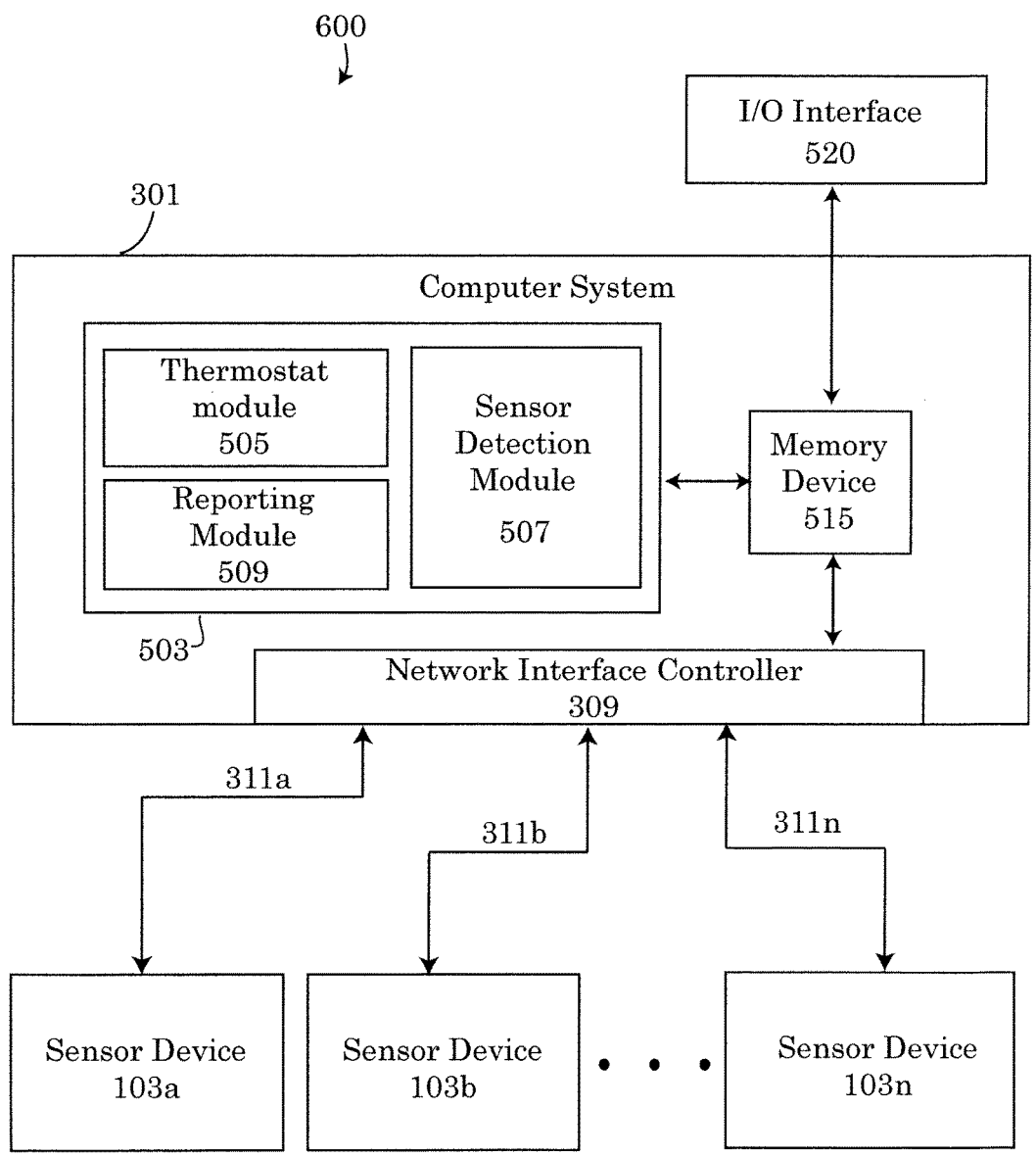
FIG. 6 illustrates a block diagram of an alternative embodiment of an air conditioning system consistent with embodiments of the present disclosure.

In an alternative embodiment of FIG. 6, the signals being transmitted, received and stored by the computer system 301 and sensor devices 103 may be sent and received wirelessly via one or more wireless signals 311a, 311b . . . 311n (hereinafter referred to collectively as "wireless signals 311"). A network controller interface 309 may regulate and control the network of sensor devices 103 and the wireless communications between the sensor devices 103 and the computer system 301.

Method for Detecting and Reporting AC Obstruction

Figure 7:
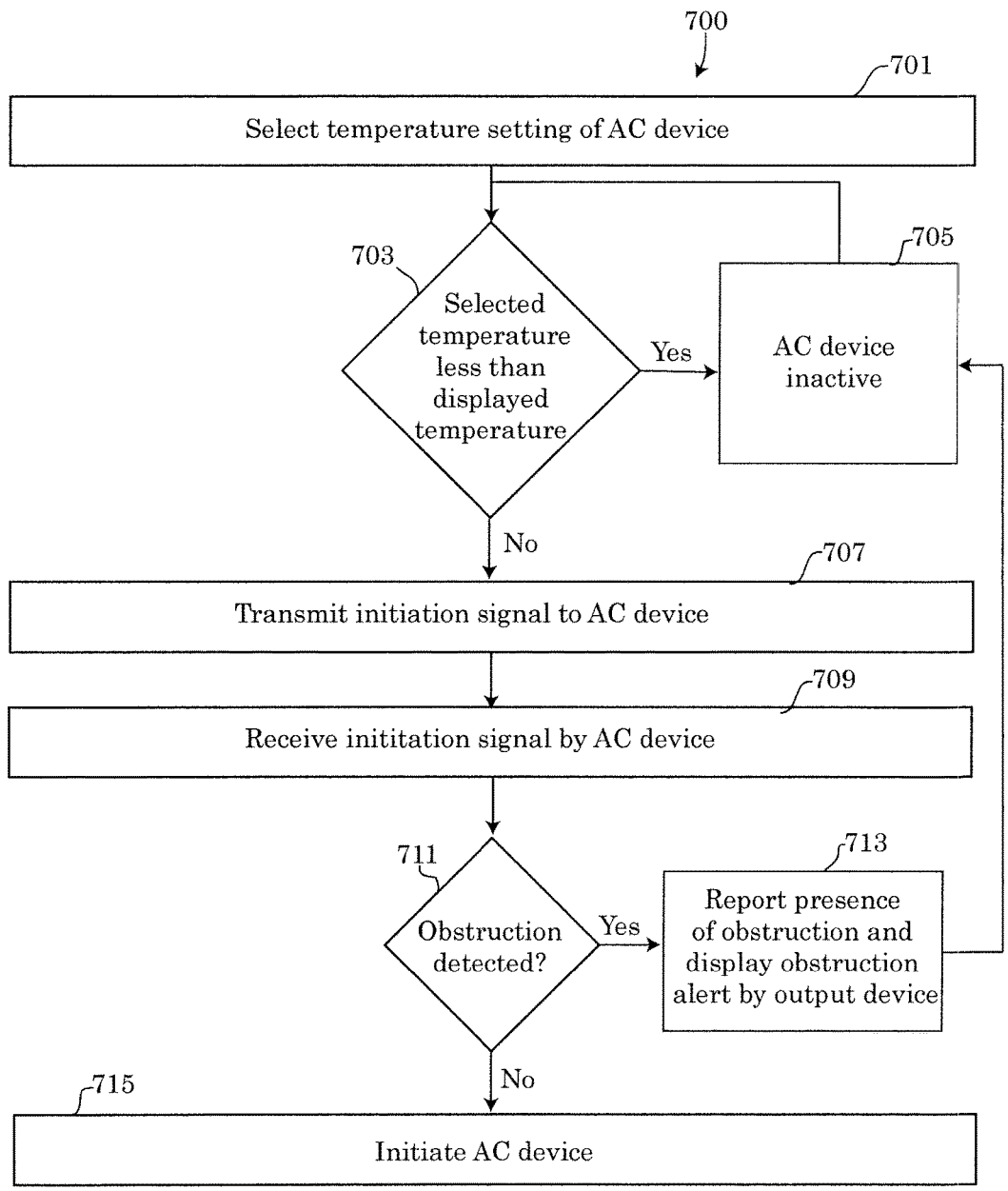
FIG. 7 illustrates a flow chart of an embodiment of a method for reporting the presence of an obstruction to an air conditioning system.
Figure 8:
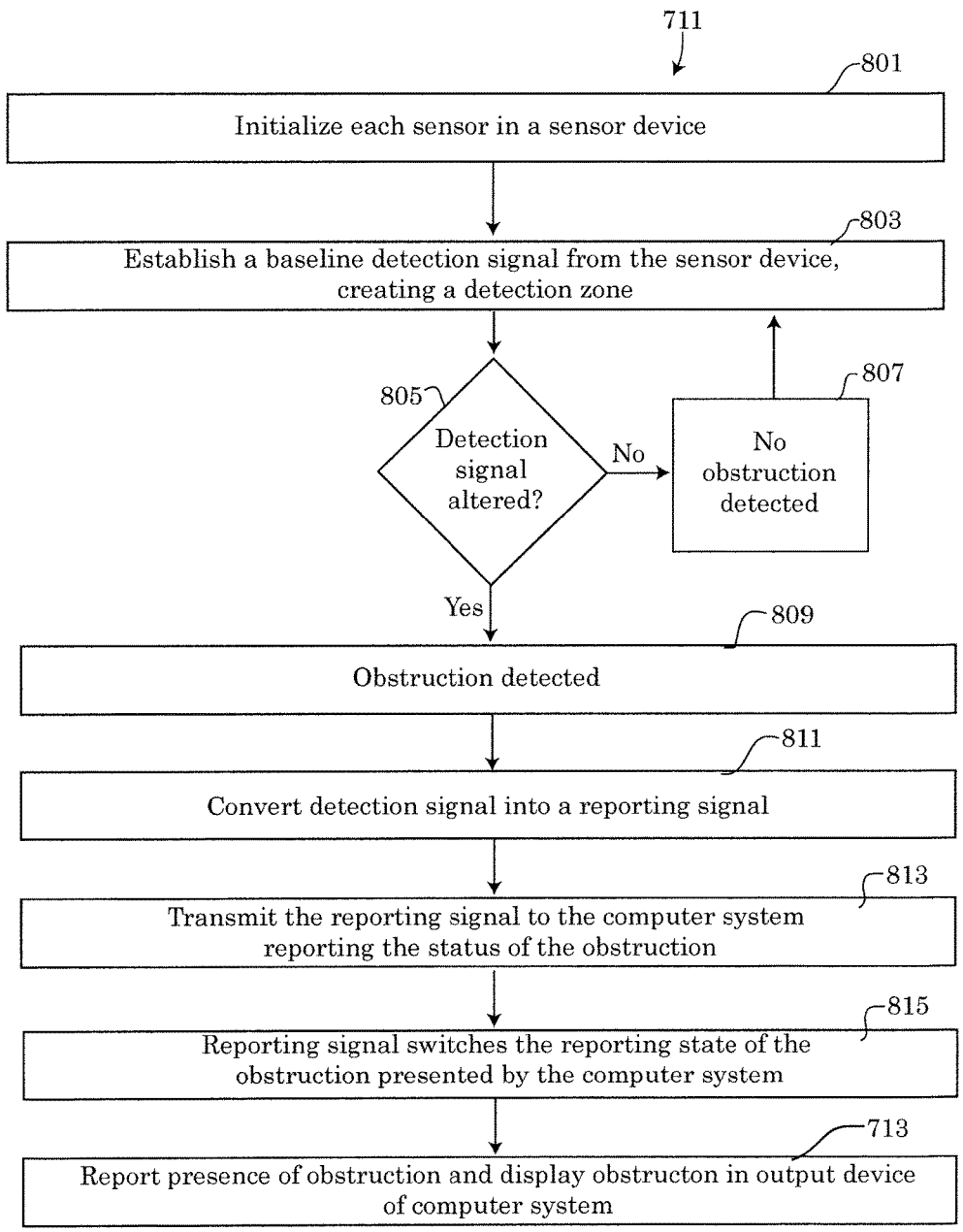
FIG. 8 illustrates an embodiment of a method for detecting the presence of an obstruction to the air conditioning system.

The drawings of FIGS. 7-8 represent embodiments of a method or algorithm that may be implemented for detecting and reporting the presence of an obstruction to an air conditioner device in accordance with the air conditioning systems described in FIGS. 1a-6 using one or more computer systems as defined generically in FIG. 9 below, and more specifically by the specific embodiments of FIG. 1a-6.

Embodiments of a method 700 for detecting and reporting the presence of an obstruction to an air conditioner may begin at step 701. In step 701, a temperature setting may be selected on the computer system 301 connected to the AC device 100 of the AC system 300, 500, 600. Step 701 may be performed by a user providing input data using one or more of the input devices 307 to select a desired temperature setting being displayed by output device 303. In step 703, the thermostat module 505 may save the selected temperature setting of step 701 and perform a comparative function in step 703 to measure whether the temperature selected in step 701 is less than or equal to the temperature of the surrounding environment being displayed on the output device 303.

If, during the temperature measurement and comparison of step 703, the temperature setting selection is less than or equal to the currently displayed temperature of the computer system 301 via the output device 303, the method may proceed to step 705. In step 705, the AC device remains inactive and does not proceed to initiate. The thermostat module 505 may periodically perform the comparison and measurement of step 703 in some embodiments at predetermined intervals of time. In alternative embodiments, the thermostat module 505 may re-perform step 703 when the current temperature displayed by output device 303 changes from the last time the temperature setting was analyzed.

On the other hand, if in step 703, it is determined that the measured temperature being displayed by the AC system 300, 500, 600 is not less than or equal to temperature selected in step 700, the method 700 may proceed to step 707. In step 707, the thermostat module 505 may transmit an initiation signal, via the computer system 301 to the AC device 100 requesting the AC device to commence operation to reduce the currently measured temperature to less than or equal to the temperature selected in step 701.

Upon receiving the initiation signal transmitted in step 707, in step 709 the AC device 100 receiving the initiation signal may proceed to step 711. In step 711, the AC system may make a determination whether or not the AC device 100 should perform the initiation step requested by the computer system 301. In some embodiments, the AC device 100 may deny or abort the request to initiate the AC device 100 if there is an obstruction present in the AC system, such as a cover placed over the AC device 100, a foreign object covering the AC device 100 or a foreign object has entered the interior section of the housing 101.

Embodiments of the method for detecting and reporting the presence of an obstruction in step 711 may be performed using additional steps of the algorithm as described in FIG. 8 of the present disclosure. The steps of the method may differ depending on the type of sensors utilized by the AC system 300, 500, 600 and the sensor device 103. The obstruction detection algorithm 711 may begin at step 801. In step 801, the AC system and more specifically, in some embodiments the sensor device 103 may initialize or activate each sensor of the sensor device. In some embodiments, the sensor detection module 507 of computer system 301 may transmit an initiation signal to the sensor device 301 instructing the sensor device to activate each of the sensors.

The step of initialization may occur by providing or switching electrical voltage to the sensor device 103 and the sensors of the sensor device. In alternative embodiments, the sensors may be mechanical or passive in nature and therefore not require an initialization step because the sensors may be continuously active.

In response to the initialization action of step 801, each of the sensors controlled and measured by the sensor device 103 may, in step 803 establish a baseline detection signal for detecting an obstruction. The baseline detection signal may create a detection zone for each sensor to identify an obstruction entering the detection zone of one or more sensors. For example, an optical sensor may emit one or more beams of light a particular distance from one another. The detection zone may be considered the area wherein an obstruction enters the boundaries of the beams of light being emitted. In another example, an acoustic sensor may emit sound waves that may travel a particular distance and have a particular height and width. The dimensions of the sound waves may operate as a detection zone because an obstruction entering the sound wave may disturb the wave and alter the baseline established, signaling to the sensor device that the environment surrounding the sensor has changed.

Once a measureable baseline detection signal has been established, the sensor device 103 and the sensors equipped as part of the sensor device may, in step 805 make a determination whether or not the detection signal has been altered. The occurrence of an alteration to the baseline detection signal established in step 803 may indicate a presence of an obstruction as the cause of the change in detection signal. For example, a force sensor may be placed on the top surface of the AC device. The force sensor may have an established electrical charge passing through the sensor as a function of the force pressing down on the force sensor. As a force presses down on the force sensor, the electrical resistance may increase or decrease (depending on the configuration of the sensor) thus changing the electrical charge passing through the sensor. Thus, when a cover 201 is placed on top of the AC device 100, the top interior surface of the cover 201 may press against the force sensor, altering the electrical resistance, alerting the sensor to the presence of an obstruction. Alternatively, in another example, the housing 101 and the cover 201 may be equipped with mating magnetic locks. When the cover is not present, the AC device may establish a baseline measurement of the magnetic field or linking between the two mate-able magnets. When the cover is present, the two magnets may mate and alter the baseline to account for the two magnets touching one another and locking together, thus altering the baseline detection signal of the unmated magnet on the housing 101 once the cover magnet is mated together.

If, in step 805, the detection signal of the sensor device 103 does not detect an alteration in the baseline detection signal, the method 711 may proceed to step 807, wherein the sensor device 103 does detect the presence of a cover or blockage. Subsequently, the method 700 may proceed back to step 803 and the sensor device 103 may continue to maintain the baseline detection signal until either the detection signal is altered, indicating the presence of an obstruction, or the sensor device is instructed to terminate operations.

If however, in step 805 the baseline detection signal established by the sensor device 103 is altered, the method for detecting and reporting the presence of an obstruction may proceed to step 809, concluding that an obstruction has been detected. Once there has been a determination by the AC system that an obstruction has been detected, in step 811 the sensor device 103 may convert the detection signal into a reporting signal. The reporting signal may be a data signal that may be indicating program instructions to the computer system 301, the sensor detection module 507 or the reporting module 509. In some embodiments, the reporting signal may be an electric or mechanical signal being sent to the computer system as a result of the alteration to the detection signal. For example, in an AC system where the alteration to the detection signal is an increased electric charge, the reporting signal may be considered the increased charge. The increased charge may be received and measured by the computer system 301 and more specifically the sensor detection module 507 which may identify the increased charge as an obstruction and instruct the reporting module 509 to output the presence of an obstruction accordingly. Alternatively, the sensor detection module 507 may include specialized hardware such as a transistor or switch that may trigger when the reporting signal of the increased electric charge is received as a result of the obstruction.

The reporting signal being transmitted from the sensor device 103 to the computer device 301 may occur in step 813. After receiving the reporting signal from the sensor device 103, the computer system 301 may translate the signal received using the sensor detection module 507 to confirm the presence of the obstruction, identify the type of obstruction and/or the location of the obstruction at the AC device 100. Upon receipt of the reporting signal transmitted in step 813, in step 815, the computer system 301 may further execute one or more commands, tasks or programmable instructions via the reporting module and/or sensor detection module 507 reporting the presence of the obstruction to the user in step 713, by switching the reporting state presented by the obstruction indicator 305 of the output device 303 in step 815 from a state of unobstructed to a state of being obstructed. The Obstruction indicator 305 in some embodiments may display the presence of the obstruction on the output device 303, specifically identify the type of obstruction, such as the presence of a cover or foreign object and/or identify the location of the obstruction.

Referring back to FIG. 7, if the determination is made that an obstruction is present using the algorithm of step 711, the AC system may report the presence of the obstruction and display an alert regarding the presence of the obstruction by the output device 303 of the computer system 301. Concurrently, due to the presence of the obstruction and the risk of harming the AC system if the AC device 100 is initiated while the obstruction is present, the AC system may proceed to inactivate the AC device in step 705, preventing the initiation signal transmitted in step 707 to activate the AC device. However, if in step 711, the AC system determines that an obstruction has not been detected, the algorithm may proceed to step 715, initiating the AC device into regular operation.

Computer System

Figure 9:
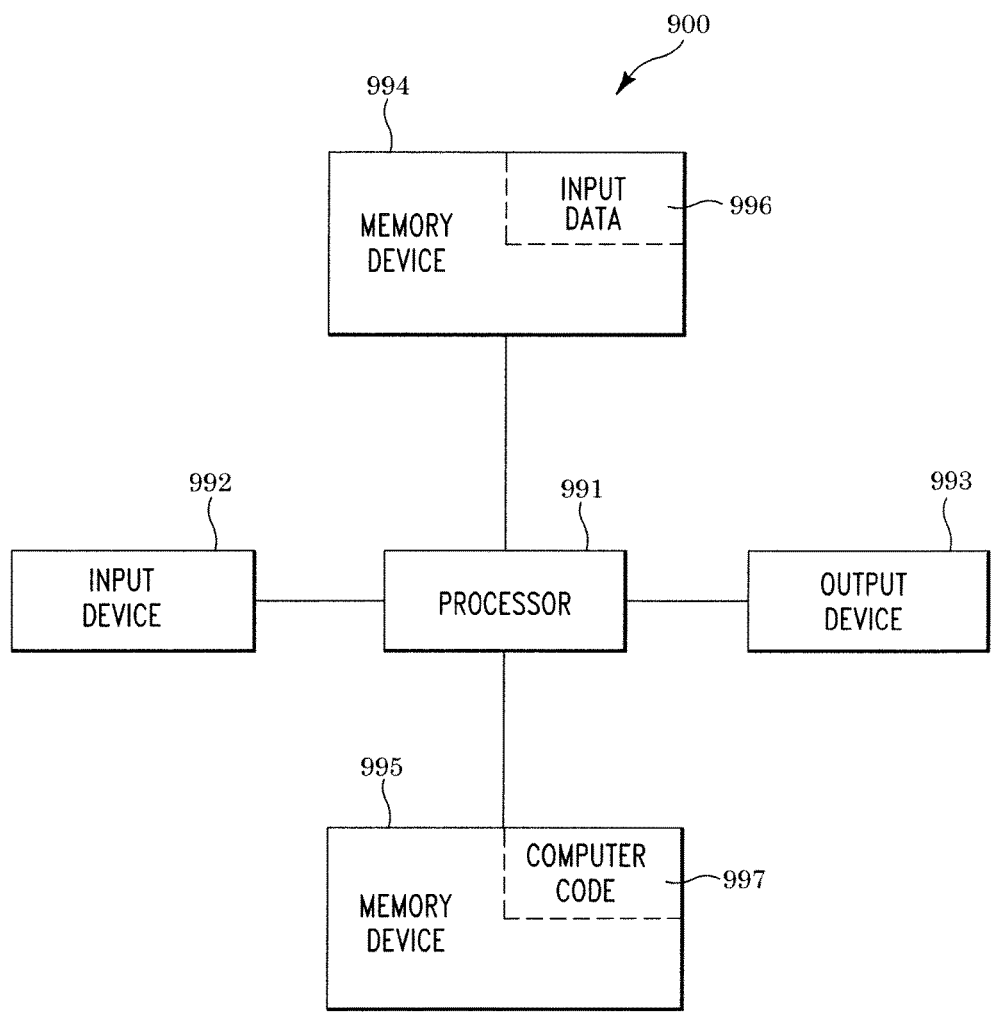
FIG. 9 illustrates a block diagram of an embodiment of a computer system consistent with the disclosure of the present application.

Referring to the drawings, FIG. 9 illustrates a block diagram of a computer system 900 that may be included in the system of FIGS. 1a-6 as computer system 301 and for implementing the methods of FIG. 7-8 in accordance with the embodiments of the present disclosure. The computer system 900 may generally comprise a processor 991, an input device 992 coupled to the processor 991, an output device 993 coupled to the processor 991, and memory devices 994 and 995 each coupled to the processor 991. The input device 992, output device 993 and memory devices 994, 995 may each be coupled to the processor 991 via a bus. Processor 991 may perform computations and control the functions of computer 900, including executing instructions included in the computer code 997 for the detecting and reporting the presence of an obstruction to an air conditioner in the manner prescribed by the embodiments of FIGS. 7-8 using the systems of FIG. 1*a*-6, wherein the instructions of the computer code 997 may be executed by processor 991 via memory device 995. The computer code 997 may include software or program instructions that may implement one or more algorithms for implementing the methods of detecting and reporting a presence of an obstruction in an air conditioning system, as described in detail above. The processor 991 executes the computer code 997. Processor 991 may include a single processing unit, or may be distributed across one or more processing units in one or more locations (e.g., on a client and server).

The memory device 994 may include input data 996. The input data 996 includes any inputs required by the computer code 997. The output device 993 displays output from the computer code 997. Either or both memory devices 994 and 995 may be used as a computer usable storage medium (or program storage device) having a computer readable program embodied therein and/or having other data stored therein, wherein the computer readable program comprises the computer code 997. Generally, a computer program product (or, alternatively, an article of manufacture) of the computer system 900 may comprise said computer usable storage medium (or said program storage device).

Memory devices 994, 995 include any known computer readable storage medium, including those described in detail below. In one embodiment, cache memory elements of memory devices 994, 995 may provide temporary storage of at least some program code (e.g., computer code 997) in order to reduce the number of times code must be retrieved from bulk storage while instructions of the computer code 997 are executed. Moreover, similar to processor 991, memory devices 994, 995 may reside at a single physical location, including one or more types of data storage, or be distributed across a plurality of physical systems in various forms. Further, memory devices 994, 995 can include data distributed across, for example, a local area network (LAN) or a wide area network (WAN). Further, memory devices 994, 995 may include an operating system (not shown) and may include other systems not shown in FIG. 9.

In some embodiments, the computer system 900 may further be coupled to an Input/output (I/O) interface and a computer data storage unit. An I/O interface may include any system for exchanging information to or from an input device 992 or output device 993. The input device 992 may be, inter alia, a keyboard, a mouse, etc. or in some embodiments the AC system sensor device 103 and the sensor device's reporting signal. The output device 993 may be, inter alia, a printer, a plotter, a display device (such as a screen or monitor of a thermostat or computer system), a magnetic tape, a removable hard disk, a floppy disk, etc. The memory devices 994 and 995 may be, inter alia, a hard disk, a floppy disk, a magnetic tape, an optical storage such as a compact disc (CD) or a digital video disc (DVD), a dynamic random access memory (DRAM), a read-only memory (ROM), etc. A bus may provide a communication link between each of the components in computer 900, including input or output devices and may include any type of transmission link, including electrical, optical, wireless, etc.

An I/O interface may allow computer system 900 to store information (e.g., data or program instructions such as program code 997) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to detecting and reporting the presence of an obstruction to an air conditioning system. Thus, an embodiment of the present invention discloses a process for supporting computer infrastructure, where the process includes providing at least one support service for at least one of integrating, hosting, maintaining and deploying computer-readable code (e.g., program code 997) in a computer system (e.g., computer 900) including one or more processor(s) 991, wherein the processor(s) carry out instructions contained in the computer code 997 causing the computer system to detect the presence of a cover or obstruction to an air conditioning device or system. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of detecting and reporting the presence of a cover or other obstruction to an air conditioning system. Thus the present invention discloses a process for supporting, deploying and/or integrating computer infrastructure, integrating, hosting, maintaining, and deploying computer-readable code into the computer system 900, wherein the code in combination with the computer system 900 is capable of performing a method for detecting and reporting the presence of a cover or other obstruction to an air conditioning system.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for detecting and reporting a presence of an obstruction to an air conditioning system comprising the steps of:

receiving, by a sensor device connected to the air conditioning system and a central processing unit (CPU), a request to initialize a sensor of the sensor device;

establishing, by the sensor device, in response to the request to initialize, a baseline detection signal further establishing a detection zone;

identifying, by the sensor device, an alteration to the baseline detection signal within the detection zone;

transmitting, by the sensor device, a reporting signal to the CPU, wherein the reporting signal switches a reporting state of an output device from unobstructed to obstructed.

2. The method of claim 1, further comprises the steps of:
receiving, by the sensor device, an initiation signal from the CPU, to initiate the air conditioning device; and
preventing, by the sensor device, initiation of the air conditioning device in the obstructed reporting state.

3. The method of claim 1, wherein the sensor is selected from the group consisting of an optical sensor, mechanical sensor, magnetic sensor and proximity sensor.

4. The method of claim 1, wherein the alteration of the detection signal occurs by blocking the detection signal of an optical sensor being emitted with an air conditioning device cover.

5. The method of claim 1, wherein the alteration of the detection signal occurs due to a blockage within an exhaust vent of the air conditioning system blocking the detection signal of the sensor.

6. The method of claim 1, wherein the reporting signal produces an increased electrical voltage transmitted to the CPU that is greater than an electrical voltage of the baseline detection signal.

7. The method of claim 1, further comprising providing at least one support service for at least one of creating, integrating, hosting, maintaining, and deploying computer-readable program code in a computer system, where the computer-readable program code in combination with the computer system is configured to implement the steps of receiving, emitting, identifying, converting and transmitting.

8. A computer system, comprising:
a central processing unit (CPU);
a memory device coupled to the CPU;
an air conditioning device having a sensor device coupled to the CPU and
a computer readable storage device coupled to the CPU, wherein the storage device contains program code executable by the CPU via the memory device to implement a method for reporting a presence of an obstruction to the air conditioning device comprising the steps of:
receiving, by a sensor device connected to the air conditioning system and a central processing unit (CPU), a request to initialize a sensor of the sensor device;
establishing, by the sensor device, in response to the request to initialize, a baseline detection signal further establishing a detection zone;
identifying, by the sensor device, an alteration to the baseline detection signal within the detection zone;
transmitting, by the sensor device, a reporting signal to the CPU, wherein the reporting signal switches a reporting state of an output device from unobstructed to obstructed.

9. The system of claim 8, wherein the method further comprises the steps of:
receiving, by the sensor device, an initiation signal from the CPU, to initiate the air conditioning device; and
preventing, by the sensor device, initiation of the air conditioning device in the obstructed reporting state.

10. The system of claim 8, wherein the sensor is selected from the group consisting of an optical sensor, mechanical sensor, magnetic sensor and proximity sensor.

11. The system of claim 8, wherein the alteration of the baseline detection signal occurs by blocking the baseline detection signal of an optical sensor being emitted with an air conditioning device cover.

12. The system of claim 8, wherein the alteration of the detection signal occurs due to a blockage within an exhaust vent of the air conditioning system blocking the baseline detection signal of the sensor.

13. The system of claim 6, wherein the reporting signal produces an increased electrical voltage transmitted to the CPU that is greater than an electrical voltage of the baseline detection signal.

14. The system of claim 6, wherein the step of transmitting the reporting signal occurs via a wireless network connection.

15. A computer program product comprising:
a computer-readable storage device; and
a computer-readable program code stored in the computer-readable storage device, the computer-readable program code containing instructions that are executed by a central processing unit (CPU) of an air conditioning system implementing a method for reporting a presence of an obstruction to an air conditioning device, the method comprising the steps of:
receiving, by the air conditioning system, a request to initialize a sensor of a sensor device;
establishing, by a sensor of the air conditioning system, in response to the request to initialize, a baseline detection signal further establishing a detection zone;
identifying, by the air conditioning system, an alteration to the baseline detection signal within the detection zone;
switching, by the air conditioning system, a reporting state of an output device from unobstructed to obstructed as a function of the identifying step.

16. The computer program product of claim 15, wherein the method further comprises the steps of:
receiving, by the air conditioning system, an initiation signal to initiate the air conditioning device; and
preventing, by the air conditioning system, initiation of the air conditioning device in the obstructed reporting state.

17. The computer program product of claim 15, wherein the sensor is selected from the group consisting of an optical sensor, mechanical sensor, magnetic sensor and proximity sensor.

18. The computer program product of claim 15, wherein the alteration of the baseline detection signal occurs by blocking the detection signal of an optical sensor being emitted with an air conditioning device cover.

19. The computer program product of claim 15, wherein the alteration of the baseline detection signal occurs due to a blockage within an exhaust vent of the air conditioning system blocking the detection signal of the sensor.

20. The computer program product of claim 15, wherein the step of switching occurs by transmitting a reporting signal having an increased electrical voltage transmitted to the CPU that is greater than an electrical voltage of the baseline detection signal.

* * * * *